(12) United States Patent
Richter et al.

(10) Patent No.: US 11,111,911 B2
(45) Date of Patent: Sep. 7, 2021

(54) DEGASSING APPARATUS

(71) Applicant: Fraunhofer-Gesellschaft zur Foerderung der angewandten Forschung e.V., Munich (DE)

(72) Inventors: Martin Richter, Munich (DE); Axel Wille, Munich (DE); Simone Strohmair, Munich (DE); Christian Wald, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 133 days.

(21) Appl. No.: 16/380,597

(22) Filed: Apr. 10, 2019

(65) Prior Publication Data

US 2019/0232230 A1   Aug. 1, 2019

Related U.S. Application Data

(63) Continuation of application No. PCT/EP2017/075811, filed on Oct. 10, 2017.

(30) Foreign Application Priority Data

Oct. 14, 2016   (DE) .................... 10 2016 220 107.7

(51) Int. Cl.
*F04B 43/04*   (2006.01)
*B01D 19/00*   (2006.01)
(Continued)

(52) U.S. Cl.
CPC ........ *F04B 43/043* (2013.01); *B01D 19/0005* (2013.01); *B01D 19/0031* (2013.01);
(Continued)

(58) Field of Classification Search
None
See application file for complete search history.

(56) References Cited

U.S. PATENT DOCUMENTS 5,205,844 A   4/1993   Morikawa
5,584,914 A   12/1996  Senoo et al.
(Continued)

FOREIGN PATENT DOCUMENTS

CN   203694678 U   7/2014
CN   104069652 A   10/2014
(Continued)

*Primary Examiner* — Jason M Greene
(74) *Attorney, Agent, or Firm* — Perkins Coie LLP; Michael A. Glenn

(57) ABSTRACT

The invention relates to an apparatus having a pressure chamber and a micropump in fluid connection with the pressure chamber. The pressure chamber includes a gas-carrying region and a liquid-carrying region. The micropump is configured to generate a pneumatic pressure within the gas-carrying region that is lower than a fluid pressure of a liquid flowing through the liquid-carrying region. According to the invention, a gas-permeable and liquid-impermeable separating element separates, at least in sections, the gas-carrying region and the liquid-carrying region. According to the present invention, the micropump is disposed on the pressure chamber.

13 Claims, 4 Drawing Sheets

(51) Int. Cl.
*F04B 53/06* (2006.01)
*F04B 35/04* (2006.01)
*F04B 49/08* (2006.01)
*F04B 19/00* (2006.01)
*F04B 37/14* (2006.01)
*B01D 53/22* (2006.01)
*B01D 63/06* (2006.01)

(52) U.S. Cl.
CPC ..... *B01D 19/0036* (2013.01); *B01D 19/0063* (2013.01); *B01D 19/0068* (2013.01); *B01D 53/22* (2013.01); *B01D 63/06* (2013.01); *F04B 19/006* (2013.01); *F04B 35/04* (2013.01); *F04B 37/14* (2013.01); *F04B 49/08* (2013.01); *F04B 53/06* (2013.01); *B01D 2053/221* (2013.01); *B01D 2311/14* (2013.01); *B01D 2311/2653* (2013.01); *B01D 2313/243* (2013.01); *F04B 2205/01* (2013.01)

(56) References Cited

U.S. PATENT DOCUMENTS

| | | | |
|---|---|---|---|
| 5,693,122 A * | 12/1997 | Berndt | B01D 19/0031 96/14 |
| 5,777,548 A | 7/1998 | Murakami et al. | |
| 5,980,742 A * | 11/1999 | Saitoh | B01D 19/0031 210/186 |
| 2001/0037731 A1 | 11/2001 | Sims et al. | |
| 2002/0037725 A1 | 3/2002 | Masuda et al. | |
| 2003/0010213 A1 | 1/2003 | Gerner et al. | |
| 2005/0079074 A1 | 4/2005 | Ishii et al. | |
| 2005/0092182 A1 | 5/2005 | Thielen et al. | |
| 2005/0098032 A1 | 5/2005 | Tsai | |
| 2006/0008913 A1 | 1/2006 | Angelescu et al. | |
| 2006/0092027 A1 | 5/2006 | Ito | |
| 2007/0012190 A1 | 1/2007 | Gerner et al. | |
| 2007/0240569 A1 | 10/2007 | Ooya | |
| 2009/0301306 A1 * | 12/2009 | Ooya | B01D 19/0031 96/6 |
| 2012/0063928 A1 | 3/2012 | Herz et al. | |
| 2013/0070027 A1 | 3/2013 | Arai et al. | |
| 2014/0096681 A1 * | 4/2014 | Buse | C10L 3/103 95/46 |
| 2014/0157983 A1 | 6/2014 | Trump et al. | |
| 2016/0008734 A1 | 1/2016 | Wang | |
| 2016/0114264 A1 | 4/2016 | Liu et al. | |
| 2016/0346485 A1 * | 12/2016 | Mohr | B01D 19/0031 |
| 2017/0056788 A1 * | 3/2017 | Liu | B01D 19/0031 |
| 2019/0232230 A1 | 8/2019 | Richter et al. | |

FOREIGN PATENT DOCUMENTS

| | | |
|---|---|---|
| CN | 105126391 A | 12/2015 |
| CN | 205007644 U | 2/2016 |
| DE | 4139735 A1 | 6/1992 |
| DE | 4446270 C1 | 2/1996 |
| DE | 19941271 A1 | 4/2001 |
| DE | 60001884 T2 | 1/2004 |
| DE | 102009012347 A1 | 9/2010 |
| DE | 102011050314 A1 | 11/2012 |
| EP | 0718016 B1 | 6/1997 |
| EP | 2017615 A1 | 1/2009 |
| EP | 2113266 A1 | 11/2009 |
| JP | H01199607 A | 8/1989 |
| JP | H03094666 | 10/1991 |
| JP | H08233791 A | 9/1996 |
| JP | H08332307 A | 12/1996 |
| JP | 2000283939 A | 10/2000 |
| JP | 2004267815 A | 9/2004 |
| JP | 2006002709 A | 1/2006 |
| JP | 2012161723 A | 8/2012 |
| JP | 2019532212 A | 11/2019 |
| WO | 2014094879 A1 | 6/2014 |

* cited by examiner

DEGASSING APPARATUS

CROSS-REFERENCE TO RELATED APPLICATIONS

This application is a continuation of copending International Application No. PCT/EP2017/075811, filed Oct. 10, 2017, which is incorporated herein by reference in its entirety, and additionally claims priority from German Application No. 10 2016 220 107.7 filed Oct. 14, 2016, which is also incorporated herein by reference in its entirety.

The invention relates to an apparatus for degassing liquids having the features of claim 1.

BACKGROUND OF THE INVENTION

Gas bubbles are one of the main problems in microfluidic systems. Bubbles can have different adverse effects:

- Due to the elastic characteristics of compressible gasses, pressure signals can be attenuated, whereby, e.g. that pressure no longer reaches a microvalve and no longer opens the same.
- The free surfaces of the gas bubble results in capillary forces that are a significant disturbance, e.g. in microvalves, small gaps or capillaries. Here, the capillary forces are the greater the smaller the geometries (Laplace's equation)
- These capillary forces also have the effect that the gas bubbles accumulate in corners and dead spaces and cannot be eliminated by flushing.
- The presence of gas bubbles can completely falsify a measurement of a liquid sensor when gas and no liquid is at the sensor membrane.

Therefore, in microfluidic systems, such gas bubbles frequently result in a failure of components or falsified measurements.

Methods for filling microfluidic systems in a bubble-free manner exist. However, it is very difficult to permanently maintain this bubble-free state during operation:

- Bubbles can be introduced into the system by transport processes
- Bubbles can result by air diffusing into the system through walls (e.g. through plastic tubes, in particular silicon) and water vapor diffuses out of the system.
- In fluidic systems, gas bubbles and gas are frequently within the liquid in a resolved manner, e.g. when the liquid is in contact with atmospheric air. During pressure changes (pressure decreases) or during temperature changes (temperature increases), gasses dissolved in a liquid medium may be supersaturated, then gassed out into bubbles and may cause the same problems.

Therefore, it would be desirable to provide technologies that separate bubbles and withdraw dissolved gas molecules from the saturated liquid.

In standard technology, both passive and active degassers are known for that.

Passive degassers are characterized by a non-wetting membrane (hydrophobic in the case of water) separating gas bubbles from the liquid. When a pressure that is higher than the atmospheric pressure prevails within the liquid, an arriving gas bubble is removed from the liquid flow by the non-wetting membrane. This increased pressure can be effected, e.g. by gravity in that the degasser is disposed vertically in a conduit. Therefore, passive degassers are only "bubble separators", and withdraw only gas bubbles and not dissolved gas from the liquid.

Active degassers also consist of a non-wetting membrane for depositing gas which is in contact with the liquid. The pressure difference as driving effect is built up with negative pressure applied from the outside. This can take place in the form of a vacuum port or vacuum pump.

For increasing the degassing rate in a gas-specific manner, "strip" gas for example, nitrogen can be used. If the gas composition in the degasser is altered in favor of the "strip" gas, the partial pressure of the other gasses, which effectively see a higher pressure difference, decreases simultaneously.

Active degassers are described, for example, in US 2005/092182 A1. US 2007/0012190 A1 describes a combination of an active degasser and a passive degasser. In both references, the active degassers described therein comprise a pressure chamber with a port by which the same can be connected to an external vacuum pump. Therefore, for evacuating the pressure chamber, a vacuum pump has to be carried along or has to be present at the respective site so that the active degassers operate at all.

For solving this problem, active degassers using ultrasound for degassing have been suggested as an alternative to the vacuum pumps generating negative pressure. Here, in the liquid to be degassed, an ultrasound wave is generated which locally causes pressure variations which again result in cavitation in the negative pressure regions. There, the dissolved gas gathers in gas bubbles and can be removed. However, degassing by means of ultrasound is very expensive and the operation is relatively complex. Additionally, ultrasound sources are significantly more expensive than conventional vacuum pumps.

SUMMARY

According to an embodiment, an apparatus may have a pressure chamber and a micropump in fluid connection with the pressure chamber, wherein the pressure chamber comprises a gas-carrying region and a liquid-carrying region, wherein the micropump is configured to generate a pneumatic pressure within the gas-carrying region that is lower than a fluid pressure of liquid flowing through the liquid-carrying region, and wherein a gas-permeable and liquid-impermeable separating element separates the gas-carrying region and the liquid-carrying region from each other at least in sections, wherein the micropump is disposed on the pressure chamber and the liquid-carrying region is a tube conduit running within the pressure chamber, wherein the tube conduit comprises, at least in sections, a material forming the gas-permeable and liquid-impermeable separating element, or wherein the separating element is a gas-permeable and liquid-impermeable membrane disposed between the gas-carrying region and the liquid-carrying region.

According to another embodiment, a liquid-carrying system may have an inventive apparatus.

Among others, the inventive apparatus comprises a pressure chamber and a micropump being in fluid connection with the pressure chamber. A micropump is a pump produced in microsystems technology. The dimensions of a micropump are normally in the range of several hundred micrometers. The micropump can be configured as a micropump chip made of silicon. The chip size can, for example be $7 \times 7$ mm$^2$ or less. The micropump can be a micro membrane pump whose membrane can be operated by means of piezo actuator. The membrane can also be made of silicon. It would also be possible to use a metal foil as pump membrane. The micropump can have a delivery rate per pump stroke, e.g. a stroke volume of 50 µl or less. Thus, the micropump is in the range of microfluidics. It is known that the characteristics of fluids in microfluidics can significantly differ from the characteristics of macroscopic fluids since in this order of magnitude of microfluidics, effects can be dominant which can frequently be neglected in classical fluid dynamics. According to the invention, the pressure chamber is divided in two parts, wherein the pressure chamber comprises gas-carrying region and a liquid-carrying region. In the gas-carrying region, a gas or a gas composite e.g., ambient air exists, which can mostly move freely within the gas-carrying region. In the liquid-carrying region, a liquid exists which can be delivered through the liquid-carrying region by means of a delivery pump, i.e. due to the fluid pressure generated by means of the delivery pump the liquid flows through the liquid-carrying region, normally with a defined flow speed. Here, the fluid pressure might only slightly differ from the atmospheric pressure. One or several gasses are dissolved in the liquid (e.g., within a gas mixture) which can at least be partly removed by means of the inventive apparatus. For this, the micropump is configured to build up a pneumatic pressure within the gas-carrying region that is lower than the fluid pressure of the liquid flowing through the liquid-carrying region. This means the micropump generates, within the pressure chamber, a pressure difference between the atmospheric pressure within the gas-carrying interior of the pressure chamber and the fluid pressure within the liquid-carrying region of the pressure chamber. Advantageously, the micropump generates a negative pressure in the gas-carrying region relative to the liquid-carrying region, i.e. the pneumatic pressure within the gas-carrying region is lower than the fluid pressure within the liquid-carrying region. In the case that the fluid pressure corresponds approximately to the ambient air pressure of the environment surrounding the pressure chamber, it can also be said that the micropump generates a negative pressure in the gas-carrying region relative to the atmospheric pressure. A gas dissolved in the liquid comprises a specific partial pressure in the environment. When the liquid is guided into the liquid-carrying region of the pressure chamber, the liquid is surrounded by the negative pressure prevailing in the gas-carrying region of the pressure chamber. Caused by this prevailing negative pressure, the partial pressure of the gas phase dissolved in the liquid decreases. As a consequence, the dissolubility or the gas absorption capacity of the liquid decreases and the gas molecules start to outgas from the liquid or to dissolve out of the liquid. Further, according to the invention, the apparatus comprises a gas-permeable and liquid-impermeable separating element which isolates the gas-carrying region and the liquid-carrying region at least in sections. The gas outgassing from the liquid can diffuse through this separating element to the outside, i.e. in the direction of the gas-carrying section of the pressure chamber, while the liquid itself cannot diffuse through this separating element. Thus, the separating element forms a liquid barrier. The portion of the gas diffused through the separating element is thus separated from the liquid. Thus, the liquid has been degassed at least partly by means of the inventive apparatus. According to the invention, the micropump is disposed on the pressure chamber. As mentioned in the beginning, conventional technology merely knows pressure chambers where ports for connecting an external vacuum pump are provided. However, these vacuum pumps are relatively large and inconvenient and hence only hardly portable. However, the present invention provides that the micropump is disposed directly on the pressure chamber or integrated in the pressure chamber.

Thus, a portable combined unit of pressure chamber and micropump results. Since the dimensions of the micropump are very small compared to conventional micropumps, the entire unit of pressure chamber and micropump can also be very compact. This significantly increases the mobility of the inventive apparatus. Additionally, the inventive apparatus merely comprises one electrical connection for the micropump which is significantly simpler to handle than thick compressed air lines leading to an external vacuum pump. It is even simpler when the micropump is battery-operated. Then, even a power supply connection can be omitted and the mobility of the inventive degassing apparatus is increased further. Thus, the inventive degassing apparatus can be used anywhere in a simple manner as a combined unit (pressure chamber plus pump) while known degassing apparatuses depend on the presence of an external vacuum pump for evacuating the pressure chamber on the site.

It is possible that the micropump is mounted on the pressure chamber by means of screw and/or clamp fixing. Therefore, the micropump can, for example, be screwed directly to the pressure chamber, wherein, of course respective sealants are to be provided at the screw holes. It would also be possible that, for example, a lid is mounted over the micropump that is fixed to the pressure chamber and hence presses the micropump onto the pressure chamber in a defined manner. This lid can be mounted on the pressure chamber, for example, by means of screws or by means of a hinge or a snap lock. An advantage of a hinge or clamp connection is that the micropumps can be easily and simply replaced, for example, in case of defect.

Alternatively or additionally, the micropump can also be mounted on the pressure chamber by means of joining means, in particular by means of an adhesive or solder. Thus, the micropump can be mounted on the pressure chamber, for example by adhesion, soldering or bonding (e.g., anodic bond, eutectic bond). The sealing effect of adhesion is greater than the one of clamping. Additionally, adhering is less expensive and no separate lid has to be provided.

It is possible that the micropump is configured to generate a negative pressure of −30 kPa up to −55 kPa with respect to atmospheric pressure in the gas-carrying region of the pressure chamber. Such a negative pressure is unusually high for micropumps and can only be obtained by precise adjustment of selected process parameters. However, it has shown that a negative pressure within the stated limits is particularly well suited to realize a high degassing rate with relatively high flow speed of the fluid flowing through the pressure chamber in microfluidic applications. Stated in numbers, despite a high flow speed of up to 100 µl/min, a degassing rate of up to 54% (absolute) has been obtained, with an average retention time of the liquid within the liquid-carrying region of the pressure chamber of approximately 48 seconds.

According to an embodiment of the invention, the separating element can be a gas-permeable and liquid-impermeable membrane that is disposed between the gas-carrying region and the liquid-carrying region. This means the gas-carrying region and the liquid-carrying region of the pressure chamber are separated by such a membrane. Advantageously, the membrane is only permeable for gasses in one direction. Accordingly, the membrane is disposed in the pressure chamber such that its permeate side is facing the gas-carrying region of the pressure chamber and the retentate side of the membrane is facing the liquid-carrying region of the pressure chamber. Thus, the liquid is retained within the liquid-carrying region of the pressure chamber by the membrane while the gas gassing out of the liquid can pass through the membrane, such that the outgassing gas can pass from the liquid-carrying region into the gas-carrying region of the pressure chamber.

Alternatively or additionally, the liquid-carrying region can be a tube conduit running within the pressure chamber. The tube conduit has the advantage that the same is flexible and can hence be placed in any form within the pressure chamber. Advantageously, a tube conduit can, for example, by installed in the pressure chamber in a spiral or helical shape, such that the retention time of the liquid flowing through this tube conduit within the pressure chamber can be increased.

Here, the tube conduit can, at least in sections, comprise a material forming the gas-permeable and liquid-impermeable separating element. This means the tube conduit can either be completely or partly made of a gas-permeable and liquid-impermeable material or can comprise the same. Advantageously, the tube conduit comprises, at least at its sections running within the pressure chamber, such a gas-permeable and liquid-impermeable material. The gas dissolved in the liquid flowing through the tube conduit can diffuse at least through these specific sections of the tube conduit into the gas-carrying region of the pressure chamber. The more gas-permeable and liquid-impermeable sections the tube conduit comprises, the greater the diffusion rate. Thus, advantageously, the entire tube conduit consists of such a gas-permeable and liquid-impermeable material.

According to embodiments of the invention, the apparatus comprises a pressure sensor fluidically coupled to the gas-carrying region and a control connected to the pressure sensor, wherein the control is configured to control the micropump in dependence on the signal of the pressure sensor such that the micropump is switched on when the pressure within the gas-carrying region of the pressure chamber rises above a threshold. When the gas from the liquid-carrying region diffuses into the gas-carrying region of the pressure chamber, the negative pressure in the gas-carrying region of the pressure chamber decreases or the absolute pressure within the pressure chamber increases. Degassing within the pressure chamber is only effective until the negative pressure prevailing in the pressure chamber is compensated to that extent that no difference to the partial pressure of the gas to be degassed exists. Thus, no pressure gradient exists anymore between the partial pressure of the gas to be degassed and the pressure prevailing in the pressure chamber. Then, the gas diffuses no longer into the gas-carrying region of the pressure chamber. In order to detect this circumstance at an early stage, the inventive apparatus can comprise a respective pressure sensor. The pressure sensor detects a specific threshold of the pressure prevailing in the pressure chamber. When the negative pressure has fallen below this threshold, e.g. by leakages or by the above-described gas diffusion, the pressure sensor communicates this pressure drop to a control. The control again controls the micropump to increase the negative pressure in the gas-carrying region of the pressure chamber again.

It is possible that the apparatus comprises a delivery pump by means of which liquid can be delivered through the liquid-carrying region. Alternatively or additionally, the micropump can also be configured to deliver liquid through the liquid-carrying region. Thus, the delivery pump has the effect of delivering the liquid to be degassed through the pressure chamber while the micropump, on the one hand, has the effect of generating a negative pressure in the gas-carrying region of the pressure chamber. In order to omit a delivery pump for making the inventive apparatus even more mobile, the micropump can also take over the delivery of the liquid to be degassed. It would also be possible that the delivery pump is also a further or additional micropump.

Here, it would be possible that the apparatus comprises a pressure sensor fluidically coupled to the gas-carrying region and a control connected to the pressure sensor and the liquid-delivering pump, wherein the control is configured to control the liquid-delivering pump in dependence on a signal from the pressure sensor such that the delivery rate of the liquid-delivering pump can be increased until the pressure within the gas-carrying region reaches a threshold and/or such that the delivery rate of the liquid-delivering pump is lowered when a pressure within the gas-carrying region exceeds a threshold. By means of this control, the degassing rate can be optimized. As already mentioned above, the degassing rate depends, among others, on the retention time of the liquid to be degassed in the pressure chamber. This retention time can be influenced either by increasing the surface of the liquid-carrying region (e.g., spiral or helical tube windings) or by the flow speed of the liquid to be degassed.

Also, it has already been discussed that diffusion of gas from the liquid-carrying region into the gas-carrying region causes a reduction of the negative pressure (or increase of the absolute pressure) in the gas-carrying region of the pressure chamber. As long as the pressure sensor determines that the negative pressure in the gas-carrying region of the pressure chamber does not fall below a predefined threshold (i.e., absolute pressure does not rise above the predefined threshold), the delivery rate of the delivery pump can be increased further. However, when the pressure sensor determines that the negative pressure in the gas-carrying region of the pressure chamber has fallen below the threshold (i.e., absolute pressure increases, negative pressure decreases) this indicates that more gas diffuses into the gas-carrying region than the micropump can evacuate from the pressure chamber. Therefore, the control controls the delivery pump such that the same reduces its delivery rate. By a reduced delivery rate, the liquid flows slower through the pressure chamber and the micropump has more time to evacuate the diffused gas out of the pressure chamber. Thereby, the negative pressure in the pressure chamber can be maintained sufficiently high.

Embodiments of the invention provide that the apparatus comprises a temperature regulating apparatus disposed in the pressure chamber that is configured to cool the gas-carrying region and/or to heat the liquid-carrying region. The temperature regulating apparatus can, for example, be a heating that heats the liquid-carrying region or a cooler that cools the gas-carrying region. By both measures, the degassing rate can be increased.

Further, it is possible that the apparatus comprises a valve fluidically coupled to the gas-carrying region that is connected to a conduit carrying stripping gas in order to introduce stripping gas into the gas-carrying region of the pressure chamber. A stripping gas is a gas that is suitable to allow stripping of the liquid to be degassed. Stripping is a physical separating method where the gas to be removed is transformed from the liquid to be degassed into the gas phase by desorption processes using Henry's Law. For this, the liquid to be degasses is brought into contact with the stripping gas according to the counter current principle.

Additionally, it is possible that gas bubble detection means are provided within the pressure chamber or in flow direction of the liquid to be delivered in front of the pressure chamber, which are configured to detect a gas bubble in the liquid to be delivered, and wherein the apparatus further comprises a control that is configured to switch on the micropump in dependence on gas bubble detection. Bubble detection can, for example, be performed capacitively or optically. In that way, the micropump can be specifically switched on when a gas bubble is detected to remove exactly this gas bubble from the liquid within the pressure chamber. Due to the fact that the micropump is switched on, it can be prevented that the negative pressure decreases too strongly within the pressure chamber due to the diffusion of the gas bubble.

Further, a control can adapt or reduce the delivery rate of the delivery pump by means of bubble detection, which also detects the size of a bubble, such that even with very large bubbles the micropump can remove the air bubble from the fluid current or fluid stream without the negative pressure decreasing too strongly or the bubble passing the negative pressure chamber. Bubble size detection can, for example, be performed capacitively in that the fluid conduit is provided with several segmented capacitive electrodes.

When a large bubble enters the degasser, this can alternatively be detected by the pressure sensor since there is a strong decrease of the negative pressure. In this case, a control can also adapt or reduce or briefly stop the delivery rate of the delivery pump until the micropump has sucked off the bubble and the negative pressure is established again. Then, the delivery pump can be set again to its normal delivery rate.

By this control it can be prevented that large air bubbles can pass the degassing module.

Additionally, it is possible that the liquid-carrying region of the pressure chamber comprises an inlet and an outlet by means of which the apparatus can be interposed in a liquid-carrying conduit of a liquid-carrying system. Such liquid-carrying systems can, for example, be:

All microfluidic systems transporting liquids in which gasses are dissolved or exist in the form of bubbles.
Fluidic measurement technology
Lab-on-Chip systems
Industry plants necessitating gas-free liquids and whose dimensions have tubes in the millimeter range and delivery rates of few ml/min.
Biotechnology and medical technology applications handling liquids in the microliter range.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
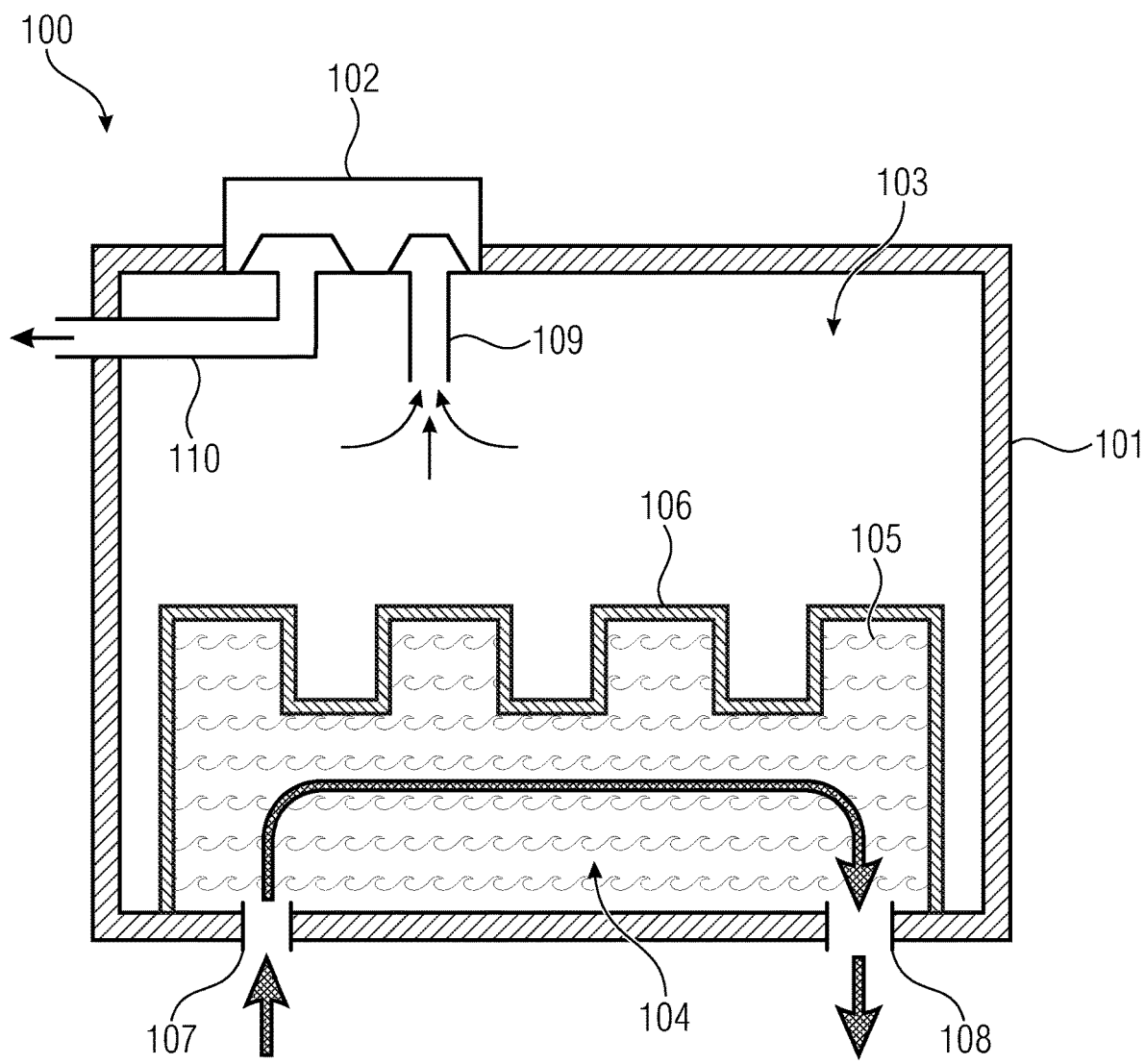
FIG. 1 is a schematic sectional view of an embodiment of an inventive apparatus.

FIG. 1 shows an inventive apparatus 100. The apparatus 100 comprises a pressure chamber 101 and a micropump 102 in fluid connection with the pressure chamber 101.

The pressure chamber 101 has a gas-carrying region 103 and a liquid-carrying region 104.

The micropump 102 is configured to generate a pneumatic pressure within the gas-carrying region 103 that is lower than the fluid pressure of a liquid 105 flowing through the liquid-carrying region 104. Gas and/or gas mixture can be dissolved in the liquid 105.

A gas-permeable and liquid-impermeable separating element 106 is disposed within the pressure chamber 101, which separates the gas-carrying region 103 and the liquid-carrying region 104 from one another at least in sections.

The micropump 102 is disposed on the pressure chamber 101.

The embodiment of the inventive apparatus 100 shown in FIG. 1 is suitable to at least partly remove gas and/or gas mixture and/or parts of a gas mixture dissolved in a liquid 105 from this liquid 105. This process is also referred to as degassing the liquid 105. Accordingly, such apparatuses 100 can also be referred to as degassers.

The inventive apparatus 100 can be interposed in a liquid-carrying system whose liquid 105 is to be degassed. For that, the pressure chamber 101 can comprise a liquid inlet 107 and a liquid outlet 108. Then, the liquid 105 to be degassed flows in the direction indicated by arrows from the inlet 107 to the outlet 108.

The region within the pressure chamber 101 through which the liquid to be degassed 105 flows is also referred to as liquid-carrying region 104 of the pressure chamber 101.

A separating element 106 separates the liquid-carrying region 104 of the pressure chamber 101 from the remaining interior of the pressure chamber 101. Here, the separating element 106 is configured as a gas-permeable and liquid permeable membrane 106. In the embodiment shown in FIG. 1, the membrane 106 is folded in order to obtain a large surface. It is also possible that the membrane is not folded.

Gas, in particular ambient air, is in the just-mentioned remaining region in the interior of the pressure chamber 101. Thus, this region of the pressure chamber 101 is also referred to as gas-carrying region 103.

A micropump 102 is disposed on the outside of the pressure chamber 101. The micropump 102 can also be disposed on the inside of the pressure chamber 101. The micropump 102 comprises a gas inlet 109 and a gas outlet 110. The gas inlet 109 is fluidically connected to the gas-carrying region 103 of the pressure chamber 101. The gas outlet 110 is fluidically connected to the environment surrounding the pressure chamber 101.

The micropump 102 is configured to suck the gas in the gas-carrying region 103 through the gas inlet 109 and to supply the same to the environment through the gas outlet 110. Since the pressure chamber is configured mostly in a pressure-tight manner, a negative pressure is formed in the pressure chamber 101 as compared to the ambient pressure.

The liquid to be degassed 105 is introduced into the pressure chamber 101 approximately at ambient pressure (or e.g., at a fluid pressure which is approximately 5%-10% above the atmospheric pressure). Depending on the ambient pressure (or the fluid pressure) as well as on the ambient temperature, a certain amount of gas or gasses is dissolved in the liquid to be degassed 105. In the environment, the gas or gas mixture dissolved in the liquid 105 has a specific partial pressure.

According to Henry's Law, the partial pressure of a gas above a liquid is directly proportional to the concentration of the gas in the liquid. This means the higher the ambient pressure the higher the partial pressure of the gas and, hence with given dissolubility, the concentration of the gas, i.e., the more gas can be absorbed by the liquid. On the other hand, with decreasing partial pressure of the gas or gas mixture, the volatility of the gas in the liquid increases (or the concentration of the gas dissolved in the liquid decreases).

This effect is used by the inventive apparatus 100. By pumping off the gas within the gas-carrying region 103 by means of the micropump 102, a pressure develops in the gas-carrying region 103 that is lower than the partial pressure of the gas (or gas component) dissolved in the liquid to be degassed 105, which is to be removed. In the gas-carrying region 103 of the pressure chamber 101 a negative pressure develops compared to the partial pressure of the gas dissolved in the liquid 105.

A pressure gradient develops between the gas-carrying region 103 and the liquid-carrying region 104, which is directed from the region of the higher pressure (liquid-carrying region 104) to the region of lower pressure (gas-carrying region 103).

Since the different gas pressures try to compensate each other, the gas dissolved in the liquid to be degassed 105 tries to flow into the gas-carrying region 103 of the pressure chamber 101.

As mentioned above, the separating element 100 is gas-permeable. Thus, the gas dissolved in the liquid to be degassed 105 can diffuse through this separating element 106 from the liquid-carrying region 104 into the gas-carrying region 103.

Since the separating element 106 is also liquid-impermeable, the liquid to be degassed 105 itself remains in the liquid-carrying region 104 of the pressure chamber 101. As a result, significantly less gas is dissolved in the liquid 105 flowing out of the pressure chamber 101 through the liquid outlet 108 than in the liquid 105 flowing into the pressure chamber 101 through the liquid inlet 107.

The micropump 102 is configured to generate a negative pressure of −30 kPa to −55 kPa with respect to the atmospheric pressure in the gas-carrying region 103. This negative pressure is particularly well suited to withdraw ambient air from the liquid to be degassed 105, which is dissolved therein.

The physical principle on which degassing the liquid by means of the inventive apparatus 100 is based will be discussed in more detail schematically with reference to FIG. 2.

Figure 2:
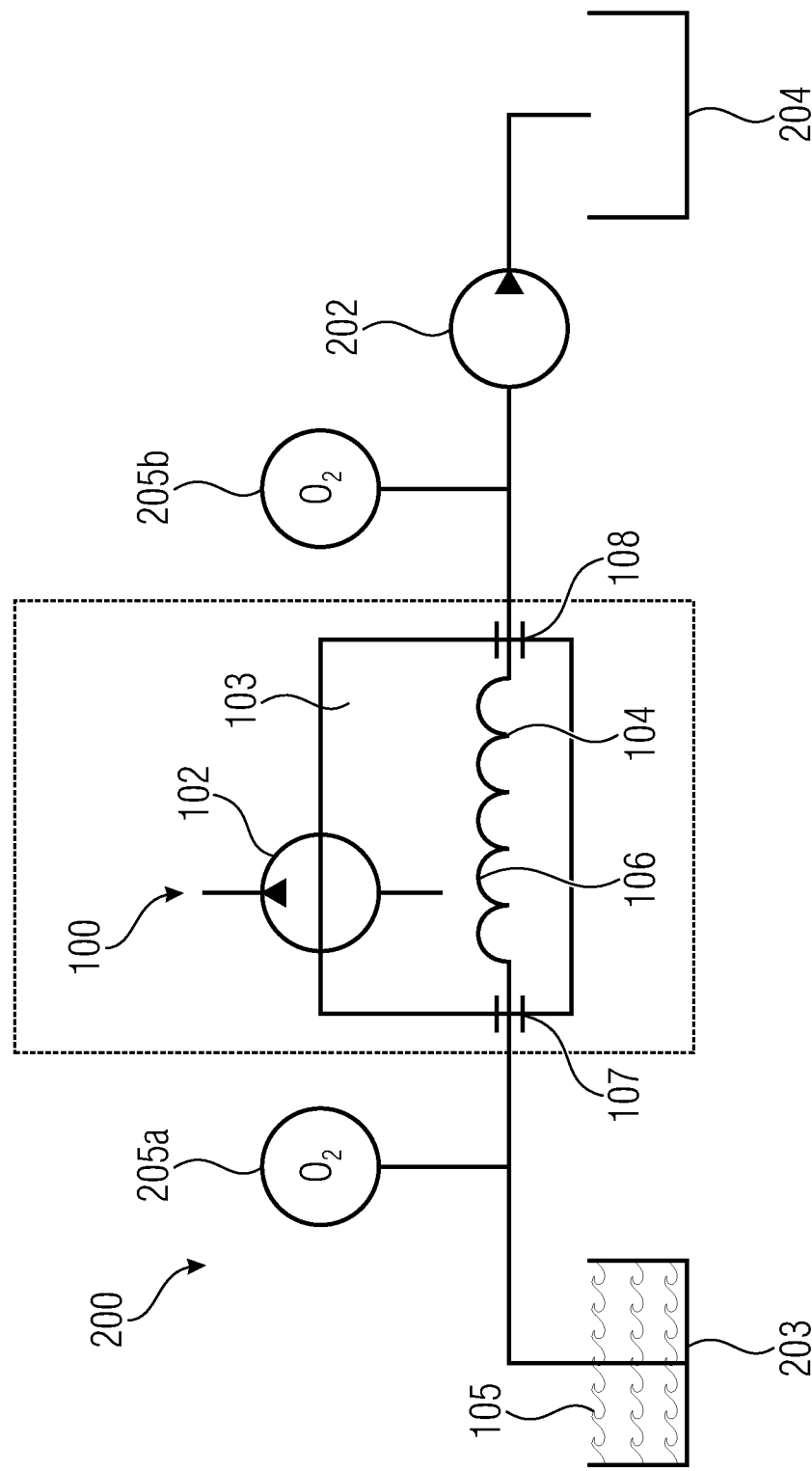
FIG. 2 is a schematic view of an inventive apparatus interposed in a liquid-carrying system.

FIG. 2 shows a liquid-carrying system 200 into which an inventive apparatus 100 for degassing a liquid 105 is interposed.

The inventive apparatus 100 comprises a pressure chamber 101. A micropump 102 is disposed on the pressure chamber 101. The micropump 102 is fluidically connected to a gas-carrying region 103 of the pressure chamber 101.

Additionally, the pressure chamber 101 comprises a liquid-carrying region 104. In this case, the pressure chamber 101 comprises a tube forming the liquid-carrying region 104.

Additionally, the tube comprises, at least in sections, a gas-permeable and liquid-impermeable material. Advantageously, the wall of the tube is made of such a material that the wall of the tube forms a gas-permeable and liquid-impermeable separating element 106. It is also possible that a non-wetting gas-permeable and liquid-impermeable membrane is incorporated in the tube wall.

Additionally, the liquid-carrying system 200 comprises a delivery pump 202 delivering a liquid to be degassed 105 from a reservoir 203 through the inventive apparatus 100 to a container 204. In flow direction before and after the inventive apparatus 100, oxygen measurement devices 205a, 205b are each disposed in the fluid conduit.

Within the reservoir 203 is water 105 in which a given amount of gas (e.g., air with 21% oxygen) is dissolved, which is characteristic for the prevailing atmospheric pressure. The delivery pump 202 pumps the liquid 105 out of the reservoir 203 through the vacuum chamber 101 where the water 105 is degassed.

Since no sensors for measuring nitrogen dissolved in water are available, the amount of air dissolved in the water is derived by measuring the oxygen concentration. The two $O_2$ sensors 205a, 205b measure the oxygen content of water 105 from which the amount of dissolved air is deduced.

The degassing effect is based on the fact that the liquid 105 in the liquid-carrying region 104 (e.g., porous tube) is guided through a chamber 101 which is subject to negative pressure (briefly called vacuum chamber or pressure chamber). The dissolved gas adapts itself to the other physical conditions (negative pressure) and diffuses through the separating element (e.g., the tube walls) 106 into the chamber 101. The micropump 102 generates the negative pressure needed for that and maintains the same during operation.

Advantageously, the delivery pump 202 is positioned behind the inventive apparatus (degasser) 100 in flow direction. If the delivery pump 202 is in front of the vacuum chamber 101, a positive pressure is generated in the liquid cycle such that the inventive apparatus (degasser) 100 cannot operate optimally and air bubbles can occur behind the vacuum chamber 101.

Figure 3:
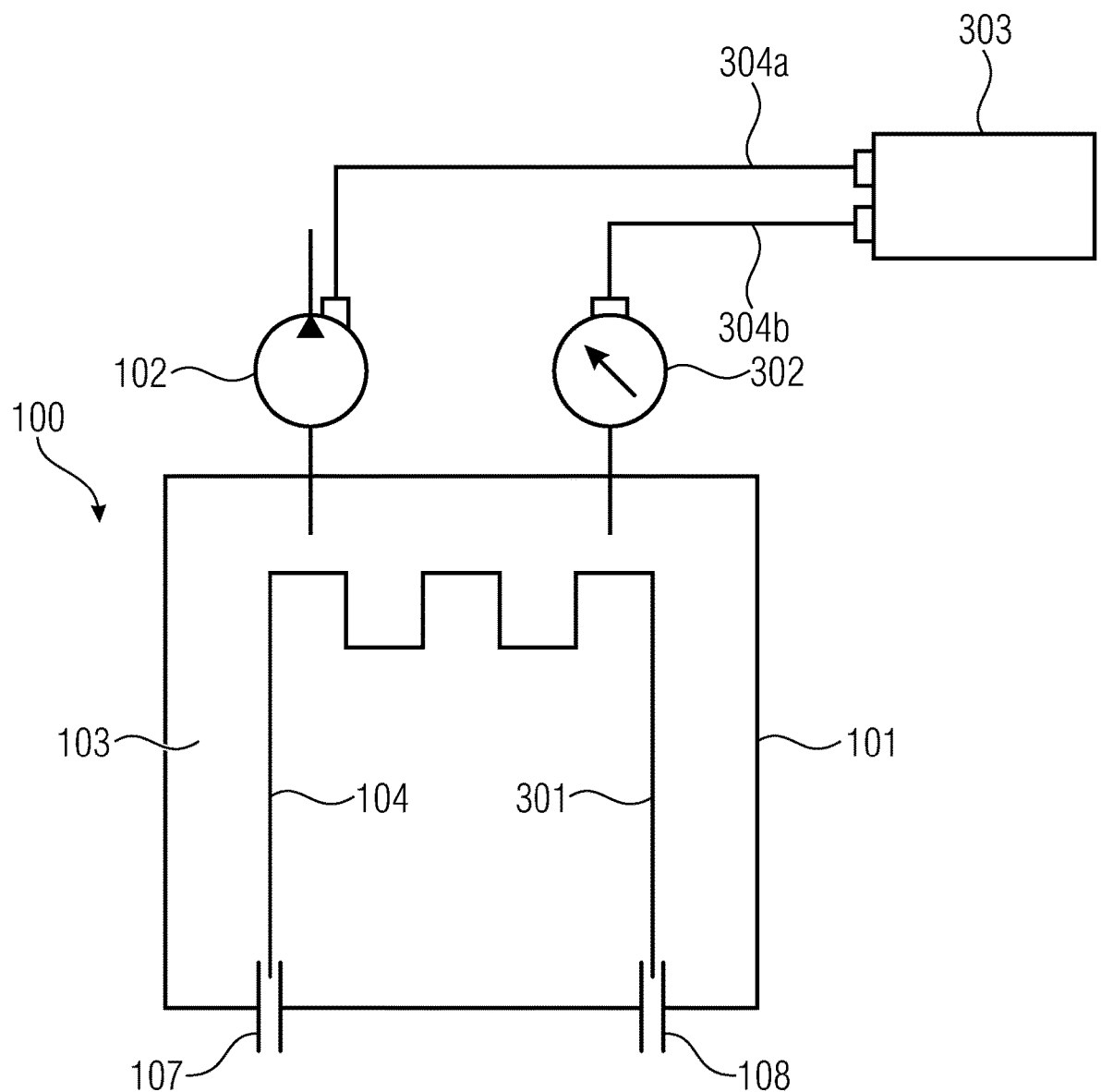
FIG. 3 is a schematic view of a further embodiment of an inventive apparatus and
FIG. 4 is a schematic sectional view of a further embodiment of an inventive apparatus interposed in a liquid-carrying system.

FIG. 3 shows a further embodiment of the inventive apparatus 100. In this embodiment, the pressure chamber 101 comprises a liquid inlet 107 and a liquid outlet 108. A tube conduit 301 is disposed between the inlet 107 and the outlet 108. The tube conduit 301 forms the liquid-carrying region 104 within the pressure chamber 101.

The walls of the tube 301 can comprise a gas-permeable and liquid-impermeable material, at least in sections. This can, for example, be porous tube. In that way, the tube walls form a separating element 106, at least at these gas-permeable and liquid-impermeable sections. When the tube 301 shows a gas-permeable and liquid-impermeable characteristic along its entire length extending within the pressure chamber 101, the tube 301 forms the liquid-carrying region 104 within the pressure chamber 101 and simultaneously the tube walls form the separating element 106 across the entire length of the tube 301 by which the gas dissolved in the liquid to be degassed 105 can diffuse into the gas-carrying region 103 of the pressure chamber 101 in order to degas the liquid 105.

For obtaining a high degassing rate, it is advantageous to place as much as possible of the tube 301 within the pressure chamber 101. Thus, as indicated schematically in FIG. 3, the tube 301 is wound up in a spiral or helical shape.

Compared to the above described embodiments, the embodiment shown in FIG. 3 additionally comprises an optional pressure sensor sensor 302. The pressure sensor 302 is fluidically coupled to the pressure chamber 101, i.e. gas exchange between the pressure sensor system 302 and the pressure chamber 101 is possible in order to measure the air pressure within the pressure chamber 101. More specifically, the pressure sensor 302 is fluidically coupled to the gas-carrying portion 103 of the pressure chamber 101.

The apparatus 101 additionally comprises a control 303. The control 303 is connected to the pressure sensor 302 and to the micropump 102 via respective signal lines 304a, 304b. The control 303 is configured to control the micropump 102 in dependence on a signal of the pressure sensor 302 such that the micropump 102 is switched on when the pressure within the gas-carrying region 103 of the pressure chamber 101 rises above a threshold.

For example, the degassing rate between a negative pressure prevailing in a pressure chamber 101 of −30 kPa to −55 kPa (with respect to atmospheric pressure) is very good. Accordingly, the control 303 could store, for example, the greater value, i.e., −30 kPa as a threshold.

When the control 303 detects, by means of the pressure sensor 302, during operation that the negative pressure drop in the pressure chamber 101 has become too large, i.e., that the pressure within the pressure chamber 101 rises above the threshold of −30 kPa and beyond, the control 303 controls the micropump 102 such that the micropump 102 starts pumping again and discharges gas from the gas-carrying region 103 again. Thereby, the negative pressure in the pressure chamber 101 increases, i.e., the pressure within the pressure chamber 101 falls again to a value below the threshold, i.e., less than −30 kPa.

Thus, the micropump 102 can be operated in a clocked manner or can be controlled as needed, for example to save energy.

Figure 4:
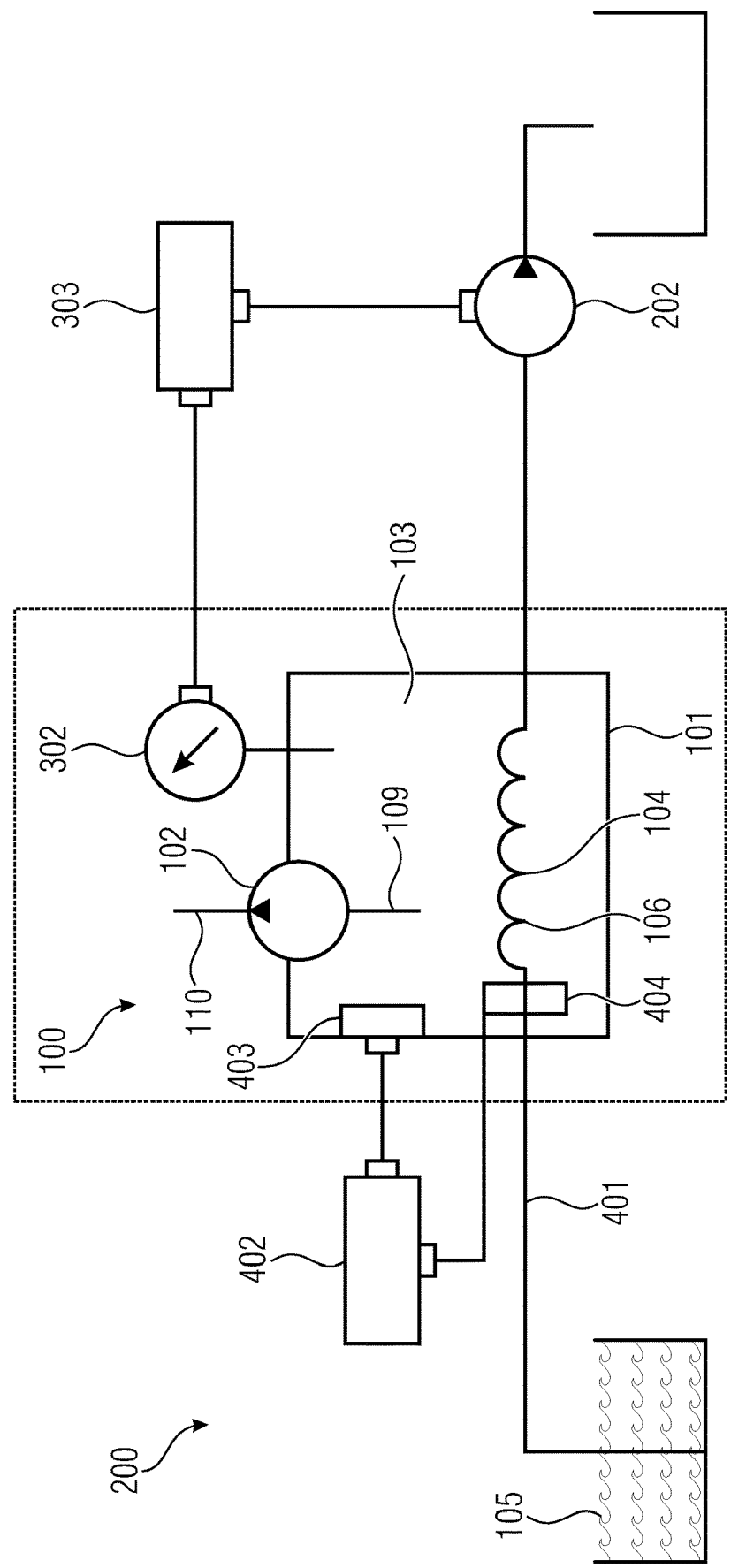

A further embodiment is shown in FIG. 4. This embodiment is similar to the embodiment described above with reference to FIG. 2. Additionally, an optional control 303 and an optional pressure sensor 302 are provided.

Here, the apparatus 100 is interposed in a liquid-carrying system 200. The liquid to be degassed 105 is delivered through the apparatus 100 by means of a delivery pump 202. The delivery pump 202 itself can be configured as a micropump.

However, it would also be possible that the micropump 102 fluidically connected to the gas-carrying region 103 of the pressure chamber 101 delivers the liquid to be degassed 105. In that case, the micropump 102 would comprise, apart from the shown gas ducts, i.e. gas inlet 109 and gas outlet 110, additional (not shown) liquid ducts, i.e. a liquid inlet and a liquid outlet that are interposed serially into the liquid-carrying conduit 401. In that way, the micropump 102 could deliver the liquid to be degassed 105 through the liquid-carrying region 104.

Depending on which pump delivers the liquid 105, i.e. either the micropump 102 or the separate delivery pump 202, the respective liquid-delivering pump 102, 202 is connected to the control 303. Additionally, the pressure sensor 302 is connected to the control 303.

The control 303 is configured to control the liquid-delivering pump 102, 202 in dependence on a signal of the pressure sensor 302 such that the delivery rate of the liquid-delivering pump 102, 202 is increased until so much gas is outgassed from the liquid 105 that the pressure within the gas-carrying region 103 reaches a threshold.

Alternatively or additionally, the control 303 is configured to control the liquid-delivering pump 102, 202 in dependence on a signal of the pressure sensor 302 such that at a pressure exceeding a threshold within the gas-carrying region 103, the delivery rate of the liquid-delivering pump 102, 202 is lowered in order to decrease the degassing rate of the liquid 105.

As already mentioned above, degassing the liquid 105 has the effect that gas diffusing from the liquid-carrying region 104 into the gas-carrying region 103 effects an increase of the pressure within the gas-carrying region 103, i.e. the negative pressure is reduced.

As long as the pressure sensor 302 determines that the negative pressure in the gas-carrying region 103 of the pressure chamber 101 does not fall below a predefined threshold, e.g. −30 kPa (i.e. absolute pressure does not rise above the predefined threshold), the delivery rate of the liquid-delivering pump 102, 202 can be increased further.

If, however, the pressure sensor 302 determines that the negative pressure in the gas-carrying region 103 of the pressure chamber 101 has fallen below the threshold, e.g. −30 kPa (i.e. absolute pressure increases, negative pressure decreases), this indicates that more gas diffuses into the gas-carrying region 103 as the micropump 102 can evacuate out of the pressure chamber 101. Thus, the control 303 controls the delivery pump 102, 202 such that the same reduces its delivery rate. By a reduced delivery rate, the liquid 105 flows slower through the pressure chamber 101 and the micropump 102 has more time to evacuate the diffused gas out of the pressure chamber 101. Thereby, the negative pressure in the pressure chamber 101 can be maintained sufficiently high.

For increasing the degassing rate further, the apparatus 100 can comprise a temperature regulation apparatus 402. The temperature regulation apparatus 402 is configured to lower the temperature within the gas-carrying region 103 of the pressure chamber 101 by means of a cooling element 403 and/or to increase the temperature of the liquid to be degassed 105 in the liquid-carrying region 104 by means of a heating element 404.

Generally, the efficiency of the inventive apparatus 100 can be influenced by means of several parameters. These are, for example, the maximum amount of dissolved gas in dependence on temperature and pressure, diffusion times of gases in liquids and through porous media (such as a tube 301 with gas-permeable and liquid-impermeable material).

Together with technical parameters of the inventive apparatus 100 and specifications of specific target applications, requirements for the dimension of the liquid-carrying region (e.g. tube) 104 and the pressure chamber 101 result.

Technical Parameters:
  Delivery rate delivery pump 102, 202
  Existing diameters of the porous tube 104, 301
  Possible negative pressure by micropump 102 up to −55 kPa
  Pressure drop due to tube length and inner diameter
  Retention time in the vacuum chamber 101 (combination of delivery rate and tube length)

Specification Application Example:
  Maximum flow rate where the degassing is to function: e.g. 100 μl/min. This delivery rate is advantageous since both in portable analysis systems (e.g. Lab-on-chip) as well as in portable medication dosage systems (in particular patch pumps), the maximum delivery rates are below this value
  With the inventive apparatus 100, the liquid 105 is to be transferred from the potentially saturated state (100% dissolved air) into a state of low saturation so that in portable microdosage systems, the liquid can no longer outgas due to variations of pressure or temperature, since bubbles can have a negative effect on dosage accuracy or sensor function. Thus, degassing of at most 30% by means of the inventive apparatus 100 can be achieved, i.e. the liquid 105 has a saturation of a maximum of 70% after passing through the inventive apparatus 100.

This results in the following requirements for tube 301 and pressure chamber 101:
  Tube inner diameter 0.61 mm
  Tube length see table 1

TABLE 1

| Flow rate [µl/min] | Tube length [m] | Tube volume [mm$^3$] | Pressure drop [kPa] |
|---|---|---|---|
| 50 | 0.14 | 58 | 0.03 |
| 100 | 0.27 | 116 | 0.13 |
| 150 | 0.41 | 174 | 0.30 |
| 200 | 0.54 | 232 | 0.54 |

The retention time in the vacuum chamber 101 is approximately 48 seconds for each of these tube lengths, which could be a suitable time for many applications at the maximum possible degassing (55%). For higher delivery rates, the degassing rate decreases.

A further boundary condition is that the vacuum chamber 101 is designed to be large enough so that the pressure in the chamber 101 does not increase too strongly at a high degassing rate or when a gas bubble is sucked out. Since the porous tube 301 can be wound up to an (spiral or helical shape) spiral, in order to not be bent, the vacuum chamber 101 can for example be shaped as a cylinder. In dependence on the tube length, chamber volumes which are a plurality of the tube volume result automatically.

In the following, the invention will be summarized in other words.

The present invention describes an apparatus 100 by which bubbles can be withdrawn from liquids 105 and also the dissolved gas can be partly withdrawn so that it is ensured that no gas bubble reaches the outlet 108 of the apparatus 100 and also no liquid saturated with gas reaches the outlet 101 and in that way no gas can outgas.

Thereby, systems can be realized where gas bubbles are disadvantageous without needing a vacuum pump or a vacuum port.

This apparatus 100 can be realized in a very small manner, and thereby liquids without bubbles can be provided even in portable applications, e.g. portable analysis systems, lap onto the systems, sensor systems, handheld devices, etc.

Technical fields of application can be, for example:
All microfluidic systems transporting liquids where gases are dissolved or exist in the form of bubbles.
Fluidic measurement technology
Lab-on-Chip systems
Industry plants needing gas-free liquids and whose dimensions have tubes in the millimeter range and delivery rates of few ml/min.
Biotechnology and medical technology applications handling liquids in the microliter range.

As an active element, the inventive apparatus 100 includes a micropump 102 having low power requirements, depending on the embodiment between 5 mW and a few hundred mW, such that degassing of the portable system is possible over a long time period with a battery.

The invention integrates the micropump 102 building up the needed negative pressure for an active degasser into the degasser component. Thus, only electric power is needed as single supply. Thus, a large advantage is mobility. A further advantage is the low space requirement. Conventional degassers need a separate pump. A further advantage is the saving of energy. Due to leakage rates at ports and connecting tubes, external pumps normally show losses that involve additional energy expenditure.

The degassing rate depends on the built-up negative pressure. In the field of microfluidic systems, the micropump 102 of the applicant is the only known micropump having a sufficiently high compression ratio for building up such a negative pressure.

In practice, it is frequently not needed to completely degas the liquid 105. It should only be ensured that the liquid 105 is degassed to such an extent that no bubbles occur during operation at common temperature and pressure variations.

It can be seen, for example in FIG. 1, that the gas-permeable and liquid-impermeable (e.g. non-wetting) membrane 106 is placed in a negative pressure chamber 101 where a micropump 102 is integrated in its shell. The needed negative pressure is thereby generated directly in a degasser component. A vacuum port can be omitted.

The degasser 100 is interposed into a fluidic system 200 at a suitable position (see also FIG. 2). Delivery of the system 200 drives the liquid to be degassed 105 though the inlet 107 into the fluid duct 104 with the non-wetting membrane (or tube) 106. The micropump 102 builds up a negative pressure in the negative pressure chamber 101. By the pressure difference in the fluid duct 104 relative to the surrounding chamber 101 gas is sucked into the chamber 101 through the non-wetting membrane 106. This reduces the negative pressure in the chamber 101 which is compensated again by the pump 102.

An optional pressure sensor 302 (see FIGS. 3 and 4) is not needed for normal operation. For energy-saving operation, the pressure sensor 302 can be used for regulating the micropump 102. The micropump 102 is only switched on when the pressure rises above a threshold (or the negative pressure falls below a threshold).

Physically, a diffusion process is behind this degasser 100 which is driven by the pressure difference between the negative pressure chamber 101 and the ambient pressure outside the chamber 101. The amount of the gas dissolved in the liquid 105 depends on the ambient pressure and the composition of the partial pressures. In the negative pressure chamber 100, a lower pressure acts on the liquid 105 and the dissolved gasses, such that this difference is compensated by diffusion. Thus, the pressure difference limits both the maximum obtainable degassing of the liquid 105 as well as the degassing rate per unit of time.

At the same time, the geometry and the permeability of the liquid-carrying region 104 with non-wetting membrane 106 influence the diffusion. From these influences, a degassing rate per unit of time results, such that the fluid speed and the fluid duct length have to be coordinated depending on the application.

When configuring the micropump 102, it has to be considered whether a liquid saturated with gas 105 is to be degassed or whether also larger gas bubbles have to be sucked. When designing the negative pressure chamber 101, its size or volume plays a main part in the buffer effect of the chamber 101. If the degassing rate exceeds the delivery rate of the micropump 102, the pressure in the negative pressure chamber 100 increases, which results in a lower degassing rate. The pressure increase depends on the size of the negative pressure chamber 101. These factors have to be considered in the interaction of all components.

In the following, some possible embodiments will be outlined in key words.
Apparatus 100 consisting of fluid conduit 104, gas-permeable element 106 and pressure chamber 101 for reducing dissolved gases in the conduit 104 that is filled with liquid and through which liquid flows due to a micropump generating negative pressure 102.
Apparatus 100 consisting of at least one fluid inlet 107 and fluid outlet 108, a fluid region 104 between fluid inlet 107 and fluid outlet 108 and a pressure chamber 101, wherein the pressure chamber 101 is at least partly separated from the fluid region 104 by a gas-permeable and liquid-impermeable separating element 106, wherein the pneumatic pressure in the pressure chamber 101 can be lowered below the fluid pressure by at least one micropump 102.

Portable apparatus with power connection or battery operation

Dissolved gases can also prevail as second phase (bubble)

Micropump 102 can be integrated in the negative pressure chamber 101 or can be connected separately Gas-permeable element 106 can exist as tube, membrane, porous plate or in a folded manner Gas-permeable material can be hydrophobic, oleophobic, etc.

Additional valve in the negative pressure chamber 101 or in the micropump conduit to prevent leakage rates or to supplement a regulation by ventilation or to introduce a "strip" gas or to introduce another defined gas composition Additional pressure sensor 302 in the negative pressure chamber 101 or micropump conduit. Connected therewith are different options of intelligent regulation for saving energy, micropump 102 is only operated when the negative pressure increases regulation of the delivery pump 102, 202 flow optimization Negative pressure remains the same→delivery rate can be increased Negative pressure increases despite maximum micropump power→lower delivery rate Continuous or demand-based operation of the micropump 102

Continuous or intermittent flow through the fluid conduit 104

Fluid delivery can also take place by the micropump 102

Additional temperature regulation in the negative pressure chamber 101 by heating or cooling elements 404, 403. Cooling the negative pressure chamber 101 and heating the fluid to be degassed 105, respectively, would increase the degassing rate.

One or several fluid conduits in the negative pressure chamber 101

Bubble detection (e.g. capacitive, optical) in front of or in the negative pressure chamber 101 and pump regulation in dependence on bubble detection for switching on the micropump 102 or to lower the delivery rate in order to suck off the gas bubble.

Detecting the degassing rate by an increase of the pressure in the negative pressure chamber 101 or by needed pump power for maintaining a pressure level, possibly with regulation that only completely degassed fluid 105 is transported further (=further miniaturization)

Detection of fluid characteristics by degassing characteristics

One feature of the inventive apparatus 100 is that the micropump 102 is disposed on the pressure chamber 101. Basically, the micropump (e.g. silicon micropump chip) 102 can be integrated in several ways into the inventive apparatus (degasser) 100.

1) Clamps

The inlet and outlet 109, 110 of the micropump 102 are at the bottom of the micropump 102. The same can be fluidically connected to the degasser housing 101 in a tight manner in that the chip is clamped over one or several sealing elements. The sealing element can, for example be a soft plastic (e.g. silicon) having respective openings in the inlets and outlets 109, 110. This plastic can be formed, for example by hot stamping or injection molding.

two O-rings onto which the pump chip 102 is clamped (when the pump chip is designed such that O-rings have enough space)

The clamp element is, for example, a lid mounted on the pump chip 102 and pressing the chip 102 onto the sealing elements in a defined manner. This lid can be mounted to the degasser 101 by several screws or by a hinge and a snap lock It has to be considered in the sealing element that the sealing is gastight with respect to the obtainable negative pressure. For this, design rules have to be considered in the clamp structures.

There are, for example, rules in the O-ring how the receivers have to be designed in order to ensure sufficient tightness at negative pressure. Here, when needed, respective structures can be realized both in the degasser housing 101 and in the pump chip 102 into which the silicon seals or the O-rings are inserted.

100 percent tightness is not needed. However, the existing leakage rates may not exceed the pump capacities for generating the negative pressure. Or, when no large energy budget is available during battery-operated application, the micropump 102 should not be continuously in operation for compensating the leakage rates and maintaining the negative pressure.

However, passive check valves in the micropump 112 also have leakage rates, such that ambient air flows back into the negative pressure chamber 101 through the switched-off micropump 102.

When the leakage rates are too large, the following might have to take place:

A passive check valve has to be designed such that the leakage rate is minimum and possibly no residual gaps exist in the closing direction.

For the seal, a "safety valve in reverse direction" is to be used (see, e.g. WO 2014/094879 A1). In these soft seals there is no residual gap.

2) Adhering or Joining with Joining Layer

The pump chip 102 can be firmly connected directly with the degasser housing 100 by adhering welding bonding (e.g. anodic bond, eutectic bond)

The arguments regarding tightness and leakage rates stated for clamping apply accordingly for joining.

Advantage: adhering is mostly tighter than clamping, additionally less expensive and no clamp lid is needed.

Regarding the product, adhering a micropump 102 with a flap valve with a small residual leakage rate is an advantageous solution, wherein the flap valves of the current Fraunhofer micropumps are already sufficiently good for degassers having approximately −50 kPa negative pressure and battery operation.

With the inventive apparatus 100, a degasser is provided. Degassers 100 have the effect of withdrawing dissolved gasses out of liquids 105. So far, a vacuum port or a large vacuum pump has been needed for that. In the inventive apparatus 100, the needed negative pressure is built up by an integrated micropump 102. This ensures increased mobility and reduces the needed supply to a power terminal.

The inventive apparatus 100 comprises a vacuum chamber 101 for degassing, into the lid of which a micropump 102, optionally a pressure sensor 302 and fluidic 104 and electric ports can be integrated. A porous gas-permeable tube 301 can be inserted inside the vacuum chamber 101. By means of the inventive apparatus 100, negative pressures of −55 kPa relative to atmospheric pressure (approximately half standard air pressure) can be built up, by which water can be degassed by almost 50%. This corresponds to approximately 85% of the theoretically possible degassing at this negative pressure.

In the present disclosure, the following terms are used:
Pressure Units 1 atmosphere=1000 mbar=1000 hPa=100 kPa Degassing Gases dissolve in liquid. This means that gas does not exist as bubble, but that individual gas molecules are mixed inbetween liquid molecules. If gas molecules are removed from a liquid, this is called degassing.
Dissolubility The dissolubility relates to the characteristic of a specific liquid of dissolving a specific gas. The higher the dissolubility, the more gas can be dissolved in the liquid. The dissolubility depends on the temperature.
Partial Pressure The partial pressure relates to the partial pressure of an individual component in a gas mixture. The sum of all partial pressures is equal to the total pressure. The partial pressure corresponds to the pressure which the individual gas component would apply when the same is solely present in the respective volume.

Additionally, the present invention can be realized in the following embodiments:

A first embodiment is an apparatus (100) with a pressure chamber (101) and a micropump (102) in fluid connection with the pressure chamber (101), wherein the pressure chamber (101) comprises a gas-carrying region and a liquid-carrying region (104), wherein the micropump (102) is configured to generate a pneumatic pressure within the gas-carrying region that is lower than a fluid pressure of a liquid (105) flowing through the liquid-carrying region (104), and wherein a gas-permeable and liquid-impermeable separating element (106) separates the gas-carrying region and the liquid-carrying region (104) at least in sections, wherein the micropump (102) is disposed on the pressure chamber (101).

According to a second embodiment with reference to the first embodiment, the micropump (102) can be mounted on the pressure chamber (101) by means of screw and/or clamp fixing.

According to a third embodiment with reference to the first or second embodiment, the micropump (102) can be mounted on the pressure chamber (101) by means of joining means, in particular by means of adhesive or solder.

According to a fourth embodiment with reference to one of the above embodiments, the micropump (102) can be configured to generate a negative pressure of −30 kPa up to −55 kPa with respect to atmospheric pressure in the gas-carrying region of the pressure chamber (101).

According to a fifth embodiment with reference to one of the above embodiments, the separating element (106) can be a gas-permeable and liquid-impermeable membrane disposed between the gas-carrying region and the liquid-carrying region (104).

According to a sixth embodiment with reference to one of the above embodiments, the liquid-carrying region (104) can be a tube conduit (301) running within the pressure chamber (101).

According to a seventh embodiment with reference to the sixth embodiment, the tube conduit (301) can comprise, at least in sections, a material forming the gas-permeable and liquid-impermeable separating element (106).

According the an eight embodiment with reference to one of the above embodiments, the apparatus (100) can further comprise a pressure sensor (302) fluidically coupled to the gas-carrying region (103) and a control (303) connected to the pressure sensor (302), wherein the control (303) is configured to control the micropump (102) in dependence on a signal of the pressure sensor (303) such that the micropump (102) is switched on when the pressure within the gas-carrying region (103) of the pressure chamber (101) rises above a threshold.

According to a ninth embodiment with reference to one of the above embodiments, the apparatus (100) can comprise a liquid-delivering pump (102, 202), by means of which liquid (105) can be delivered through the liquid-carrying region (104), or wherein the micropump (102) is configured to deliver liquid (105) through the liquid-carrying region (104).

According to a tenth embodiment with reference to the ninth embodiment, the apparatus (100) can comprise a pressure sensor (302) fluidically coupled to the gas-carrying region (103) and a control (303) connected to the pressure sensor (302) and the liquid-delivering pump (102, 202), wherein the control (303) is configured to control the liquid-delivering pump (102, 202) in dependence on a signal of the pressure sensor (302) such that the delivery rate of the liquid-delivering pump (102, 202) is increased until the pressure within the gas-carrying region (103) reaches a threshold and/or such that the delivery rate of the liquid-delivering pump (102, 202) is lowered at a pressure exceeding a threshold within the gas-carrying region (103).

According to an eleventh embodiment with reference to one of the above embodiments, the apparatus (100) can comprise a temperature regulation apparatus (402) that is configured to cool the gas-carrying region (103) and/or to heat the liquid-carrying region (104).

According to a twelfth embodiment with reference to one of the above embodiments, the apparatus (100) can comprise a valve fluidically coupled to the gas-carrying region (103) which is connected to a strip gas-carrying conduit in order to introduce a strip gas into the gas-carrying region (103) of the pressure chamber (101).

According to a thirteenth embodiment with reference to one of the above embodiments, a gas bubble detection means can be provided within the pressure chamber (101) or in a flow direction of the liquid (105) in front of the pressure chamber (101), which is configured to detect a gas bubble in the liquid (105), and wherein the apparatus (100) further comprises a control (303) that is configured to switch on the micropump (102) in dependence on a detected gas bubble.

According to a fourteenth embodiment with reference to one of the above embodiments, the liquid-carrying region (104) of the pressure chamber (101) can comprise an inlet (107) and an outlet (108) by means of which the apparatus (100) can be inserted in a liquid-carrying conduit (401) of a liquid-carrying system (200).

Further embodiments provide a liquid-carrying system (200) with an apparatus (100) according to one of the above embodiments.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus, comprising
   a pressure chamber and a micropump in fluid connection with the pressure chamber,
   wherein the pressure chamber comprises a gas-carrying region and a liquid-carrying region,
   wherein the micropump is configured to generate a pneumatic pressure within the gas-carrying region that is lower than a fluid pressure of liquid flowing through the liquid-carrying region,
   and wherein a gas-permeable and liquid-impermeable separating element separates the gas-carrying region and the liquid-carrying region from each other at least in sections,
   wherein the micropump is disposed on the pressure chamber and the liquid-carrying region is a tube conduit running within the pressure chamber, wherein the tube conduit comprises, at least in sections, a material forming the gas-permeable and liquid-impermeable separating element, and
   wherein the micropump is configured to generate a negative pressure of −30 kPa to −55 kPa with respect to atmospheric pressure in the gas-carrying region of the pressure chamber.

2. Apparatus according to claim 1, wherein the tube conduit is disposed in the pressure chamber in a spiral shape.

3. Apparatus according to claim 1, wherein the micropump comprises a stroke volume per pump stroke of 50 µl or less.

4. Apparatus according to claim 1, wherein the micropump is mounted on the pressure chamber by means of screws and/or clamps.

5. Apparatus according to claim 1, wherein the micropump is mounted on the pressure chamber by means of adhesive or solder.

6. Apparatus according to claim 1, wherein the apparatus comprises a liquid-delivering pump by means of which liquid can be delivered through the liquid-carrying region or wherein the micropump is configured to deliver liquid through the liquid-carrying region.

7. Apparatus according to claim 6, wherein the apparatus comprises a pressure sensor fluidically coupled to the gas-carrying region and a control connected to the pressure sensor and the liquid-delivering pump, wherein the control is configured to control the liquid-delivering pump in dependence on a signal of the pressure sensor such that the delivery rate of the liquid-delivering pump is increased until the pressure within the gas-carrying region reaches a threshold and/or such that the delivery rate of the liquid-delivering pump is lowered at a pressure exceeding a threshold within the gas-carrying region.

8. Apparatus according to claim 1, wherein the apparatus further comprises a pressure sensor fluidically coupled to the gas-carrying region and a control connected to the pressure sensor, wherein the control is configured to control the micropump in dependence on a signal of the pressure sensor such that the micropump is switched on when the pressure within the gas-carrying region of the pressure chamber rises above a threshold.

9. Apparatus according to claim 1, wherein the apparatus comprises a temperature regulation apparatus that is configured to cool the gas-carrying region and/or to heat the liquid-carrying region.

10. Apparatus according to claim 1, wherein the apparatus comprises a valve fluidically coupled to the gas-carrying region connected to a strip gas-carrying conduit in order to introduce a strip gas into the gas-carrying region of the pressure chamber.

11. Apparatus according to claim 1, wherein optical or capacitive gas bubble detectors are provided within the pressure chamber or in flow direction of the liquid in front of the pressure chamber, which are configured to detect a gas bubble in the liquid and wherein the apparatus further comprises a control that is configured to switch on the micropump in dependence on a detected gas bubble.

12. Apparatus according to claim 1, wherein the liquid-carrying region of the pressure chamber comprises an inlet and an outlet by means of which the apparatus can be interposed in a liquid-carrying conduit of a liquid-carrying system.

13. Liquid-carrying system comprising an apparatus according to claim 1.

* * * * *